(12) United States Patent
Lal

(10) Patent No.: US 11,316,332 B2
(45) Date of Patent: Apr. 26, 2022

(54) BRACKET FOR POWER TRANSMISSION POLES AND A METHOD OF FABRICATING THE SAME

(71) Applicant: Madan Lal, Punjab (IN)

(72) Inventor: Madan Lal, Punjab (IN)

( * ) Notice: Subject to any disclaimer, the term of this patent is extended or adjusted under 35 U.S.C. 154(b) by 0 days.

(21) Appl. No.: 17/028,939

(22) Filed: Sep. 22, 2020

(65) Prior Publication Data

US 2022/0094149 A1 Mar. 24, 2022

(51) Int. Cl.
*A47B 96/06* (2006.01)
*H02G 7/05* (2006.01)

(52) U.S. Cl.
CPC .................................. *H02G 7/053* (2013.01)

(58) Field of Classification Search
CPC ...................................................... H02G 7/053
USPC ....................................................... 248/218.4
See application file for complete search history.

(56) References Cited

U.S. PATENT DOCUMENTS

| | | | |
|---|---|---|---|
| 5,878,940 A * | 3/1999 | Rosenbalm | B23K 31/02 228/184 |
| 6,761,502 B2 | 7/2004 | Bishop et al. | |
| 7,044,677 B2 | 5/2006 | Moser et al. | |
| 8,704,394 B1 * | 4/2014 | Jones | F03D 9/00 290/55 |
| 9,355,797 B1 * | 5/2016 | Cleaveland | H01H 33/6661 |
| 9,770,122 B2 | 9/2017 | Gonzalez et al. | |

FOREIGN PATENT DOCUMENTS

| | | |
|---|---|---|
| DE | 102010054183 A1 | 6/2012 |
| DE | 102015117033 A1 | 4/2017 |
| EP | 3005904 | 4/2016 |
| GB | 2197183 A | 5/1988 |
| GB | 2364665 A | 2/2002 |

OTHER PUBLICATIONS

Michal Starý et al. Experimental optimization of tab and slot plug welding method suitable for unique lightweight frame structures. The Society of Manufacturing Engineers. Published by Elsevier Ltd. Available online Dec. 12, 2017. pp. 453-467.

* cited by examiner

*Primary Examiner* — Todd M Epps
(74) *Attorney, Agent, or Firm* — Aslan Law, P.C.

(57) ABSTRACT

The present invention discloses a bracket (1) with enhanced loadbearing capacity for power transmission poles wherein protrusions (52) extending from loadbearing plates (12, 13) are inserted into horizontal and parallel slots made in the base plate (11), and protrusions (52) are bent behind the base plate (11). After insertion and bending, protrusions (52) portion of loadbearing plates (12, 13) are secured by welding on both sides namely the front and rear of the base plate (11). The bending of protrusions of loadbearing plates (12, 13) behind the base plate (11) and welding it on both sides considerably improve the strength of the joint, and thus the loadbearing capacity of the bracket is significantly enhanced.

10 Claims, 5 Drawing Sheets

BRACKET FOR POWER TRANSMISSION POLES AND A METHOD OF FABRICATING THE SAME

TECHNICAL FIELD

The present invention relates to a bracket for power transmission poles, and particularly, a bracket with enhanced loadbearing capacity for power transmission poles and a method for fabricating a bracket with enhanced loadbearing capacity for power transmission poles having a base plate and a plurality of loadbearing plates coupled to the base plate wherein the loadbearing plates have enhanced loadbearing capacity on account of improvement in the coupling between the loadbearing plates and the base plate.

BACKGROUND OF THE INVENTION

Brackets are mounted on the power transmission poles to provide support to electrical components such as electrical cables, connectors and transformers etc. In the existing brackets for power transmission poles, the loadbearing plates of flats bars are merely welded to the power transmission poles or another plate of the bracket which is mounted on the power transmission poles. On account of which the loadbearing capacity of the bracket is considerably low and therefore, in case of heavy winds or rains, the loadbearing plates or flat bars get detached from the poles or plate of the bracket causing accidents or damage to the equipment and interruption in power supply.

There has been a long felt need for a bracket with enhanced loadbearing capacity for use in power transmission poles.

Therefore, one of the main objects of the present invention is to increase the loadbearing capacity of the bracket for power transmission poles.

Another object of the present invention is to provide improved coupling between the loadbearing plates and the base plate in a more secured manner.

Another object of the present invention is to provide bracket that can withstand heavy winds and rains.

Another object of the present invention is to improve the fitment of the base plate with the power transmission pole.

Any reference herein to known prior art does not, unless the contrary indication appears, constitute an admission that such prior art is commonly known by those skilled in the art to which the invention relates, at the priority date of this application.

SUMMARY OF THE PRESENT INVENTION

The present invention discloses a novel construction of a bracket with enhanced loadbearing capacity for power transmission poles wherein protrusions or notches extending from loadbearing plates are inserted in horizontal and parallel slots made in the base plate, and said protrusions or notches are bent behind the base plate. After bending of the protrusions or notches, the joint is welded throughout on both sides improving the strength of the joint, and thus the loadbearing capacity of the bracket is considerably enhanced.

Further, the present invention provides an oval shaped slot at the middle of the base plate to provide better fitment of the bracket with the power transmission poles.

The present invention also discloses a method of fabricating a bracket with enhanced loadbearing capacity for power transmission pole. The method comprising steps of fabricating a base plate, loadbearing plates, forming protrusions or notches in the loadbearing plates, forming slots or apertures in the base plate for receiving said protrusions or notches, inserting the protrusions or notches extending from said loadbearing plates through said slots or apertures in said base plate, bending the inserted portion of said protrusions or notches on the reverse side of the base plate making L-bends, welding of the inserted and bent protrusions or notches of loadbearing plates throughout on the front and the reverse of the base plate to secure said loadbearing plates to said base plate.

Other aspects, advantages of certain embodiments, and salient features of the invention will become apparent to those skilled in the art from the following detailed description, which, taken in conjunction with the annexed drawings, discloses exemplary embodiments of the invention.

BRIEF DESCRIPTION OF ACCOMPANYING DRAWINGS

The various aspects, features, and advantages of the present invention will be more apparent from the following description taken in conjunction with the accompanying drawings, in which.

DETAILED DESCRIPTION OF THE PRESENT INVENTION

Figure 1:
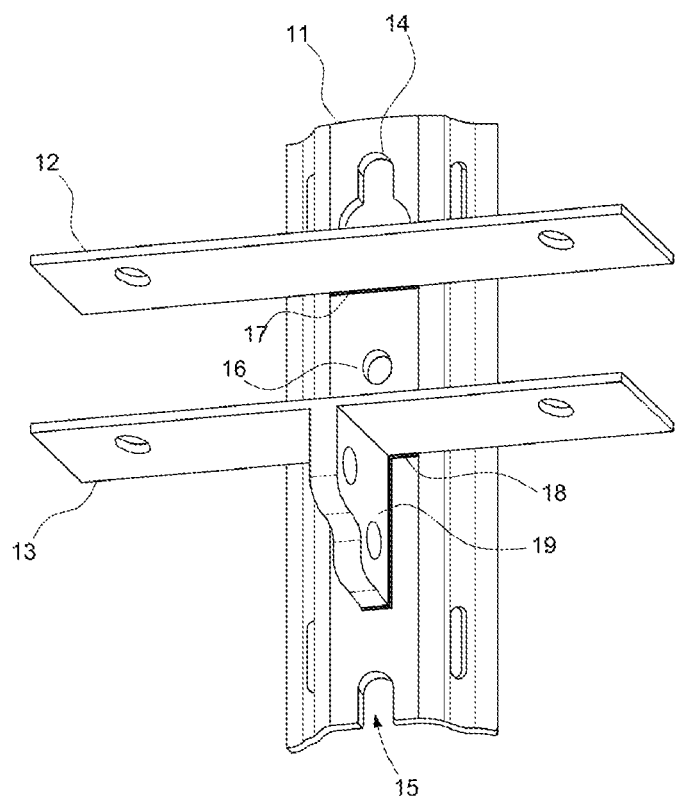
FIG. 1 illustrates a bracket for the power transmission poles according to the present invention.

The embodiments herein and the various features and advantageous details thereof are explained more fully with reference to the non-limiting embodiments that are illustrated in the accompanying drawings and detailed in the following description. Descriptions of well-known components and processing techniques are omitted to not unnecessarily obscure the embodiments herein. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

The present invention discloses a bracket with enhanced loadbearing capacity for power transmission poles having a metal base plate and a plurality of metal loadbearing plates coupled to the base plate wherein a protruded portion of the side of each of the loadbearing plates is inserted into slots shaped openings made in the base plate and the inserted portion is bent behind the base plate. The joint is welded from both sides of the base plate improving the strength of the joint, and thus the loadbearing capacity of the bracket is significantly enhanced. In the present invention, a boat shaped upright base plate having a plurality of horizontal and parallel slots to which a portions protruding from the horizontal and parallel loadbearing plates are inserted and bent on the reverse side of the base plate and are further secured by welding on the front and rear of the base plate.

In the present invention, a bracket (1) with enhanced loadbearing capacity for power transmission pole has been developed. The constructional element of the bracket comprises of a base plate (11) secured to the power transmission pole by securing means in the vertical direction and a plurality of loadbearing plates (12, 13) are joined at right angle to the base plate (11). The plurality of loadbearing plates (12, 13) are oriented horizontally and spaced apart vertically from each other. Each of the loadbearing plate consists of a protrusion or notch (52) extending from longer edge of the loadbearing plate. The base plate (11) has plurality of slots or apertures for receiving the protrusion or notch (52) extending from the loadbearing plate (11). The protrusion fit into the slots of the base plate (11) and after insertion protrusion portion is bent to form L-bends (34, 35). The protrusion or notch after insertion into the slots or aperture of the base plate (11) forms L-bends (34, 35) on the reverse side of the base plate (11). After formation of L-bends on the reverse side of base plate, the provisional positive connection is made between the base plate and the loadbearing plates. Subsequently, the loadbearing plate is coupled to the base plate by welding the slot portion, on the front and reverse side of the base plate (11), and L-bends (34, 35) portion on the reverse side of the base plate (11). The material used for the for manufacture of the base plate, loadbearing plates and other parts of the bracket is steel of grade ASTM A 36 Grade 50.

A preferred embodiment of the present invention is described in FIG. 1. FIG. 1 is a view of a bracket (1) as it is joined with a power transmission pole. The FIG. 1 shows a base plate (11) which is affixed/secured to the power transmission pole through two slots (14, 15) and an oval shaped slot (16) in the middle by suitable securing mechanism such as nut and bolt mechanism. Two loadbearing plates, upper plate (12) and lower plate (13), are coupled to the base plate (11). This coupling is done by fabricating a protrusion or notch in both the loadbearing plates (12, 13) and inserting said protrusions or notches through two horizontal and parallel slots/apertures in the base plate (11) and bending the inserted portion of said protrusion or notch of loadbearing plates (12, 13) behind the base plate (11) making L-bends. After formation of L-bends on the reverse side of base plate, the provisional positive connection is made between the base plate and the loadbearing plates. Subsequently, the inserted and bent protrusions or notches of loadbearing plates (12, 13) are secured by welding throughout on both sides namely the front and the reverse sides of the base plate. The bending of said protrusions or notches of loadbearing plates (12, 13) behind the base plate (11) and welding it throughout on both sides namely the front and rear of the base plate provides necessary tensile strength to the loadbearing plates. The loadbearing plates are used for placing electrical components. A supporting member (19) provides support to the lower loadbearing plate (13) and the supporting member (19) is welded to the base plate (11) and on the lower side of lower loadbearing plate (13). The main purpose to supporting member (19) is to provide support to lower loadbearing plate where the heavier components used for power transmission are placed. The welding on the front side (17, 18) of the protrusions or notches of the loadbearing plates (12, 13) in the slots/apertures of the base plates is depicted in the FIG. 1.

In the conventional brackets for power transmission poles, the loadbearing plates are merely welded to the power transmission poles or the base plate of the bracket which is mounted on the power transmission poles. In the conventional brackets, there are no slots in the base plate and straight flat bar are simply welded to the base plate. There is no extra part/protrusion which can be inserted into slots and welded on both sides to provide additional strength to the loadbearing plates or bars. This results in low loadbearing capacity of brackets available in the prior art.

Figure 2:
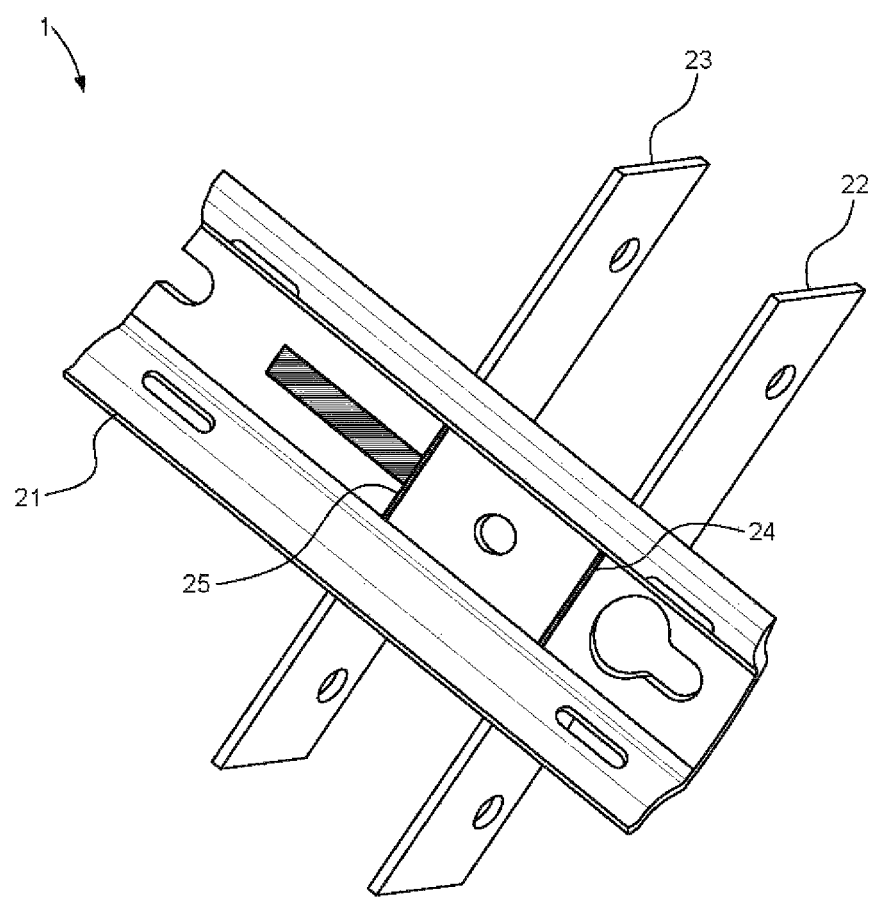
FIG. 2 is a reverse perspective view of the bracket for the power transmission poles of the present invention of FIG. 1.

FIG. 2 is a reverse perspective view of the bracket for power transmission pole of the present invention of FIG. 1 showing welding on both sides of protrusions or notches extending from the loadbearing plates through slots/apertures in the base plate and bent on the reverse side of the base plate. In the bracket (1), protrusions or notches from upper loadbearing plate (22) and lower loadbearing plate (23) after insertion into the base plate (21) are bent behind the base plate (21) in the form of L-bends. After formation of L-bends on the reverse side of base plate, the provisional positive connection is made between the base plate and the loadbearing plates. Subsequently, the inserted and bent protrusions or notches of loadbearing plates (22, 23) are secured by welding throughout on both sides namely the front and rear of the base plate. The welding on the back side (24, 25) of the protrusions or notches of the loadbearing plates (22, 23) in the slots of the base plates and of the L-bends is depicted in the FIG. 2.

Figure 3:
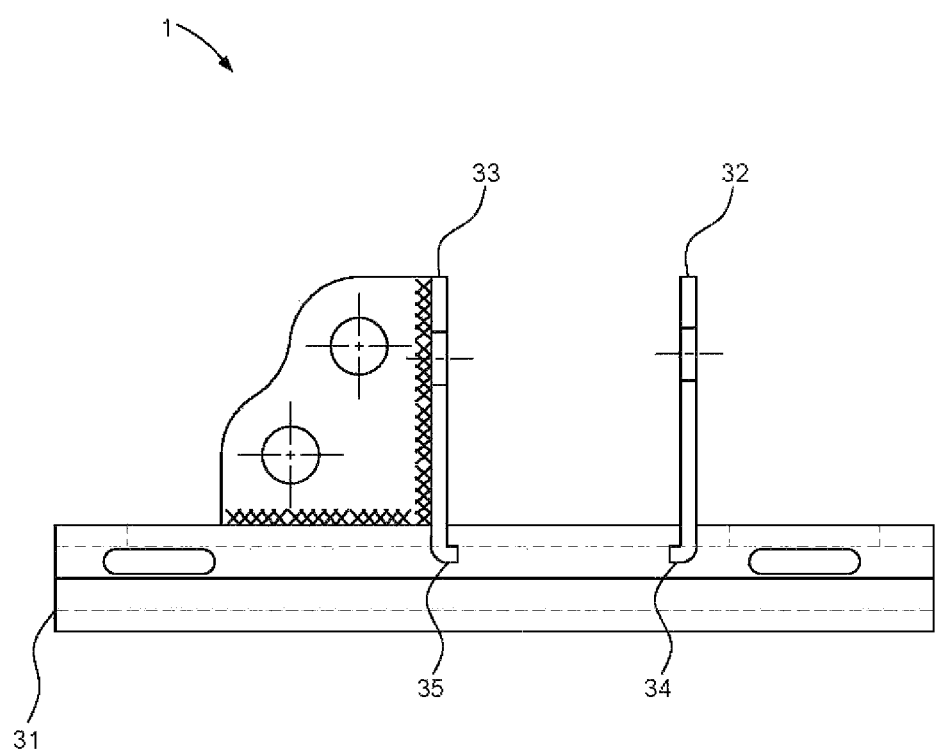
FIG. 3 illustrates a view of section of the bracket for the power transmission poles of the present invention.

FIG. 3 illustrates a view of section of the bracket for power transmission pole of the present invention showing bending of two protrusions or notches extending from the two loadbearing plates through two slots in the base plate. In the bracket (1), two protrusions or notches (34, 35) of loadbearing plates (32.33) are inserted into slots in the base plate (31) and after insertion, said protrusion or notches are bent behind the base plate (31) forming L-bends (34, 35) as shown in the FIG. 3. The protrusion fit into the slots of the base plate (31) and after insertion protrusion portion is bent to form L-bends (34, 35). The protrusion or notch after insertion into the slots or aperture of the base plate (31) forms L-bends (34, 35) on the reverse side of the base plate (11). The upper plate protrusion is bent downward to form L-bend (34) whereas the lower plate protrusion is bent upward to form L-bend (35). The formation of L-bends on the reverse side of base plate provides the provisional positive connection between the base plate and the loadbearing plates.

Figure 4:
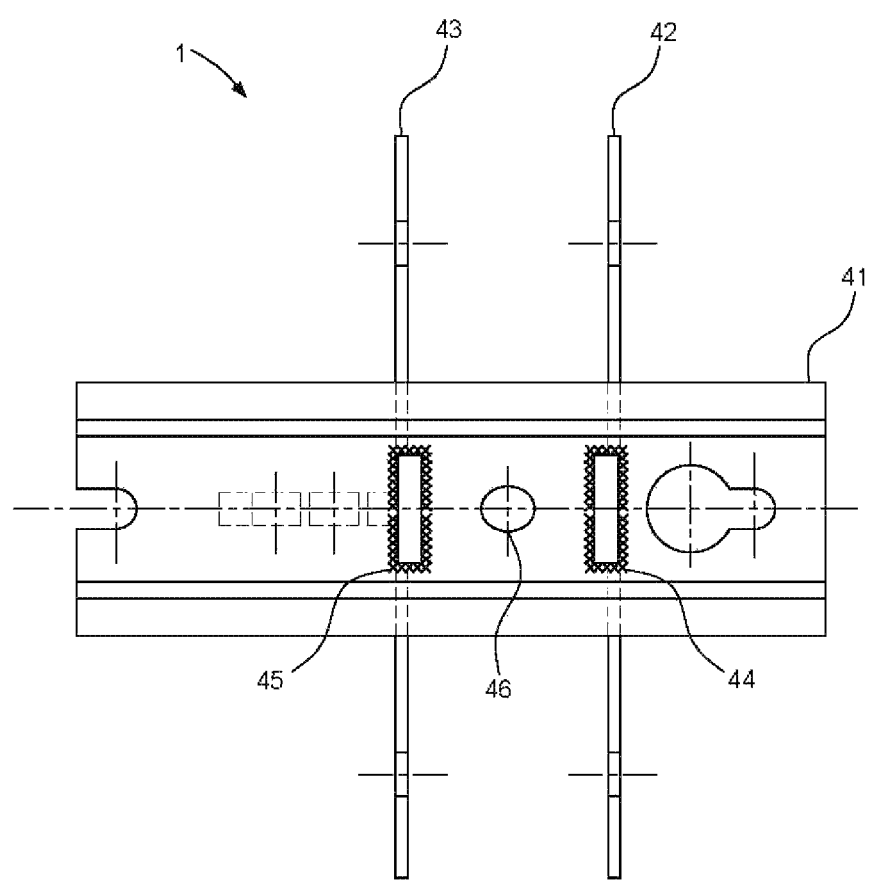
FIG. 4 is a rear view of FIG. 3.

FIG. 4 is a reverse view of FIG. 3 showing welding on both sides of protrusions or notches extending from the loadbearing plates through slots into the base plate and bent on the reverse side of the base plate. In the bracket (1), protrusions or notches from upper loadbearing plate (42) and lower loadbearing plate (43) after insertion into the base plate (41) are bent behind the base plate (41) in the form of L-bends. The inserted and bent protrusions or notches of loadbearing plates (42, 43) are secured by welding (44, 45) throughout on both sides namely the front and the reverse of the base plate (41). Further, the present invention provides an oval shaped slot/aperture (46) at the middle of the base plate (41). The slot is made oval shaped instead of round shaped for the reason it provides a better adjustment/fitment of the bracket (1) with the power transmission poles.

Figure 5:
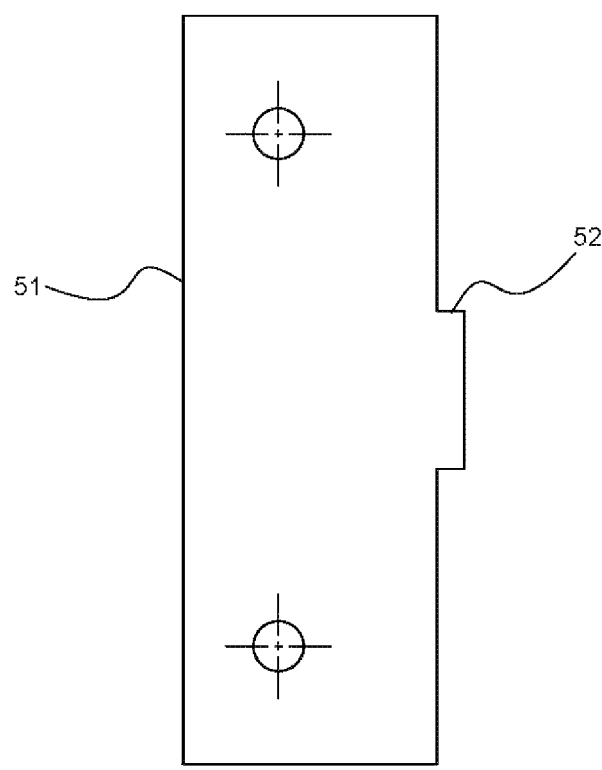
FIG. 5 illustrates an enlarged view of section of a loadbearing plate showing a protrusion or notch extending from the loadbearing plate.

FIG. 5 illustrates an enlarged view of section of a loadbearing plate (51) showing a protrusion or notch (52) extending from the loadbearing plate (51). The protrusion or notch (52) is inserted into a slot/aperture of the base plate and the protrusion or notch portion (52) is bent behind the base plate of the bracket and welded throughout on the front side and the reverse side of the base plate.

The inventor of the present invention has also developed a method of fabricating a bracket with enhanced loadbearing capacity for power transmission pole. According to the invention, the method comprises steps of fabricating a base plate. The base plated is fabricated having a flat surface in the middle and curved surfaces on either side of the flat surface. Further, loadbearing plates are fabricated in a rectangular shape. In each of the loadbearing plates, a rectangular shaped protrusion or notch is formed, wherein said protrusion or notch extends from the longer edge of said loadbearing plate. In the base plate, a plurality of horizontal and parallel equally spaced rectangular slots or apertures are formed on the flat surface of said base plate for receiving said protrusion or notch extending from said loadbearing plates. The loadbearing plates are oriented perpendicular to the base plate. The protrusion or notch extending from the longer edge of the each of said loadbearing plates is inserted through said slot or aperture in the flat surface of said base plate. After insertion of the protrusion or notch, the inserted portion of said protrusion or notch of said loadbearing plates is bent on the reverse side of the base plate making L-bends. After making L-bends of inserted protrusion or notch, welding is done of the inserted and bent protrusions or notches of loadbearing plates throughout on the front and reverse of the base plate to secure said loadbearing plates to said base plate. A supporting member is welded to the base plate and on the lower side of lower loadbearing plate. Finally, the bracket is secured to the power transmission pole through two slots at two ends of said base plate and an oval shaped slot in the middle of said base plate by nut and bolt mechanism in the vertical direction.

The improved coupling between the loadbearing plates and the base plate provides higher tensile strength to the loadbearing plates as compared to the conventional bracket. The loadbearing capacity of the bracket of the present invention has been measured as approximately 210920 N and the loadbearing capacity of the previously known bracket is approximately 138400 N, which represents an increase of about 50 percent in the loadbearing capacity of the present invention over the known prior art. On account of higher loadbearing capacity of the bracket of the present invention, the loadbearing plates remain intact with base plate of the bracket during heavy winds or rains, thus, avoiding accidents or damage to the equipment and interruption in power supply.

The foregoing description of the present invention will so fully reveal the general nature of the embodiments/aspects herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

I claim:

1. A bracket (1) with enhanced loadbearing capacity for a power transmission pole, said bracket (1) comprising:
   a base plate (11) secured to the power transmission pole by securing means in a vertical direction;
   a plurality of loadbearing plates (12, 13) coupled at right angle to the base plate (11), wherein plurality of loadbearing plates (12, 13) are oriented horizontally and spaced apart vertically from each other;
   wherein each of said loadbearing plate consists of a protrusion (52) extending from longer edge of the loadbearing plate;
   wherein said base plate (11) has plurality of slots for receiving protrusion (52) extending from the loadbearing plate (11);
   wherein the protrusion fit into the slots of the base plate (11) and after insertion forms L-bends (34, 35) on a reverse side of the base plate (11) to form provisional positive connection between the base plate (11) and the loadbearing plates (12, 13); and
   wherein the loadbearing plate is coupled to the base plate by welding a slot portion on a front and reverse side of the base plate (11), and L-bends (34, 35) portion on the reverse side of the base plate (11).

2. The bracket for the power transmission pole as claimed in claim 1, wherein the base plate (11) is secured to the power transmission pole through two slots (14, 15) and an oval shaped slot (16) in a middle for nut and bolt mechanism.

3. The bracket for the power transmission pole as claimed in claim 1, wherein the base plate (11) is a flat surface in a middle to which the loadbearing plates (12, 13) are coupled and is curved on either side of the flat surface.

4. The bracket for the power transmission pole as claimed in claim 1, wherein the loadbearing plates (12, 13) are rectangular in shape and are coupled to the flat surface of the base plate (11) along the longer edge of the loadbearing plate through the protrusions (52) extending from the loadbearing plates into the slots in the flat surface of the base plate (11).

5. The bracket for the power transmission pole as claimed in claim 1, wherein the slots in the base plate to receive the protrusion from the loadbearing plate are horizontal and parallel and are equally spaced in the vertical direction.

6. The bracket for the power transmission pole as claimed in claim 1, wherein a length of the protrusion is equal to the flat surface of the base plate (11).

7. The bracket for the power transmission pole as claimed in claim 1, wherein the bracket comprises two loadbearing plates (12, 13) coupled to the base plate (11), and wherein said two loadbearing plates (12, 13) include an upper loadbearing plate (12) and a lower loadbearing plate (13).

8. The bracket for the power transmission pole as claimed in claim 7, wherein the bracket further comprises a supporting member (19) which is welded to the base plate (11) and on a lower side of the lower loadbearing plate (13).

9. A method of fabricating a bracket (1) with enhanced loadbearing capacity for a power transmission pole, the method comprising:
   fabricating a base plate (11), wherein said base plate consists of a flat surface in a middle and curved surface on either side of the flat surface;
   fabricating plurality of loadbearing plates (12, 13), wherein said loadbearing plates (12, 13) are rectangular in shape;
   forming a protrusion or notch (52) in each of said loadbearing plates (12, 13), wherein said protrusion extends from a longer edge of said loadbearing plate;
   forming plurality of horizontal and parallel equally spaced slots on the flat surface of said base plate (11) for receiving the protrusions (52) extending from said loadbearing plates (12, 13);
   orienting the plurality of loadbearing plates (12, 13) at right angle to the base plate (11);
   inserting said protrusions (52) extending from the longer edge of the each of said loadbearing plates through said slots in the flat surface of said base plate (11);
   bending an inserted portion of said protrusions of said loadbearing plates (12, 13) on a reverse side of the base plate (11) making L-bends (34, 35) to form provisional positive connection between the base plate (11) and the loadbearing plate (12, 13);

welding the inserted and bent protrusions of said loadbearing plates (12, 13) throughout on a front and reverse of the base plate (11) to secure said loadbearing plates (12, 13) to said base plate (11); and securing said bracket (1) to the power transmission pole through two slots (14, 15) at two ends of said base plate (11) and an oval shaped slot (16) in a middle of said base plate(11) for nut and bolt mechanism in a vertical direction.

10. The method as claimed in claim 9, further comprising welding a supporting member (19) to the base plate (11) and on a lower side of a lower loadbearing plate (13).

* * * * *